United States Patent Office 3,444,737
Patented May 20, 1969

3,444,737
LIQUID LEVEL INDICATING DEVICE
John James Jago, Liverpool, England, assignor to Pilkington Brothers Limited, Liverpool, England, a corporation of Great Britain
Filed Nov. 24, 1967, Ser. No. 685,524
Claims priority, application Great Britain, Nov. 25, 1966, 52,988/66
Int. Cl. G01f 23/00
U.S. Cl. 73—290        11 Claims

ABSTRACT OF THE DISCLOSURE

A liquid level indicator is operated by gas pressure variations at the outlet from a hollow probe directed towards the liquid, the probe being connected with the indicator through a device which is responsive to gas pressure at the outlet in excess of a predetermined maximum value occurring when the outlet is at least partly closed by the liquid, and the outlet is so shaped and dimensioned as to be progressively closed on entry into the liquid and to ensure that when it is above the liquid it is not restricted solely by surface tension of residual liquid.

BACKGROUND OF THE INVENTION

Field of the invention

This invention relates to apparatus for measuring the height of the surface of a liquid and has particular application to the measurement of the height of the surface of a liquid at high temperature, such as molten glass.

Description of the prior art

Devises for measuring the height of the surface of molten glass fall into two classes, electric current devices and pneumatic devices.

Electric current devices rely on contact between a vertically displaceable probe and the surface of the molten glass to complete a sensing circuit which extends from the probe through the molten glass to a fixed electrode in the molten glass. Thus, when the probe is downwardly displaced, under control, towards and into the molten glass surface the instant of contact is registered by completion of the sensing circuit and the liquid level is identified with the position of the probe at the instant of contact. Such a device has only limited application because electric currents in the glass can cause bubbles to be formed therein.

Pneumatic measuring devices usually comprise a vertically displaceable probe having a nozzle above the glass with a relatively small gas outlet arranged at or near the centre of a relatively large under-face of the nozzle, and gas under pressure flows continuously from the gas outlet towards the molten glass surface. As the probe is downwardly displaced, the gas flowing from the gas outlet at first escapes readily to atmosphere whilst the nozzle is remote from the glass surface, but, as the gap between the said under-face and the molten glass surface is reduced, escape of the gas to atmosphere becomes increasingly restricted and an increase in the gas pressure within the nozzle occurs. A pressure switch, sensitive to the pressure in the nozzle, is actuated when the pressure in the nozzle exceeds a predetermined value and actuation of the pressure switch should theoretically indicate that a certain gap has been established between the underface of the nozzle and the surface of the glass.

This type of device thus indicates a certain gap between the nozzle and the molten glass and the effectiveness of the device is seriously impaired by contact between the nozzle and the molten glass. Such contact causes glass to adhere to the underface of the nozzle and obstructs the escape of gas from the gap during the next sensing stroke so raising the pressure in the nozzle and causing the sensing device to be actuated at a false nozzle position. Furthermore, these devices operate at high pressure to maintain the gas outlet clear of foreign matter such as condensates of the molten glass, and as the gap underneath the nozzle narrows the high pressure gas streams can disrupt the free surface of the liquid and thus allow the probe to measure a false height of the liquid surface.

A main object of the present invention is to provide a device for measuring the height of the surface of a liquid which may be a high temperature liquid such as molten glass in which the aforesaid disadvantages are minimised or elinimated.

SUMMARY

The device according to the invention comprises a hollow probe mountable above the liquid surface and having a gas outlet disposed in its lower end portion to direct gas issuing therefrom towards the surface of the liquid, means for supplying gas to the hollow probe, a device responsive to gas pressure at the probe outlet in excess of a predetermined maximum value occurring when the outlet is at least partially closed by the liquid, the probe outlet being of such dimensions and shape as to be progressively closed on entry thereof into the liquid and so that, when it is above the liquid surface, restriction of the outlet by the liquid to cause the gas pressure to be at the said predetermined maximum value will not be sustained solely by the surface tension of the liquid, and an indicator device operatively connected with said device responsive to gas pressure at the probe outlet and arranged to record the height of the liquid as determined by the immersion or partion immersion of the probe outlet in the liquid.

The provision of a relatively large bore gas outlet, say of ¼" diameter and which bore may be at least partially closed by the liquid, allows a very low pressure of gas to be used. For example, the device sensitive to pressure can operate at 0.075" water gauge, and thus the gas may be at such low pressure throughout the sensing cycle that it has little or no disturbing effect on the liquid surface, and very accurate and consistent working of the device can be achieved.

The inclination of the underface of the gas outlet relative to the horizontal allows liquid picked up by the outlet and condensates thereon to drain down to the lowermost regions of the underface where they are prevented from obstructing the escape of gas from the gas outlet. The immersion of the lowermost regions of the probe in the liquid when the liquid is being measured also ensures that foreign matter which has drained to the lowermost region of the undersurface of the outlet is not allowed to solidify and accumulate thereon but is absorbed by the molten glass.

The probe may remain at a fixed height so as to indicate when the surface of liquid has risen to a certain level. In a preferred form of the invention, however, the device includes means operable by the device responsive to gas pressure at the probe outlet for raising and lowering the probe so that the probe adjusts its height to the differing height of the surface of the liquid, whereby the probe gives repeated indications of the surface height.

DESCRIPTION OF THE PREFERRED EMBODIMENT

Figure 1:
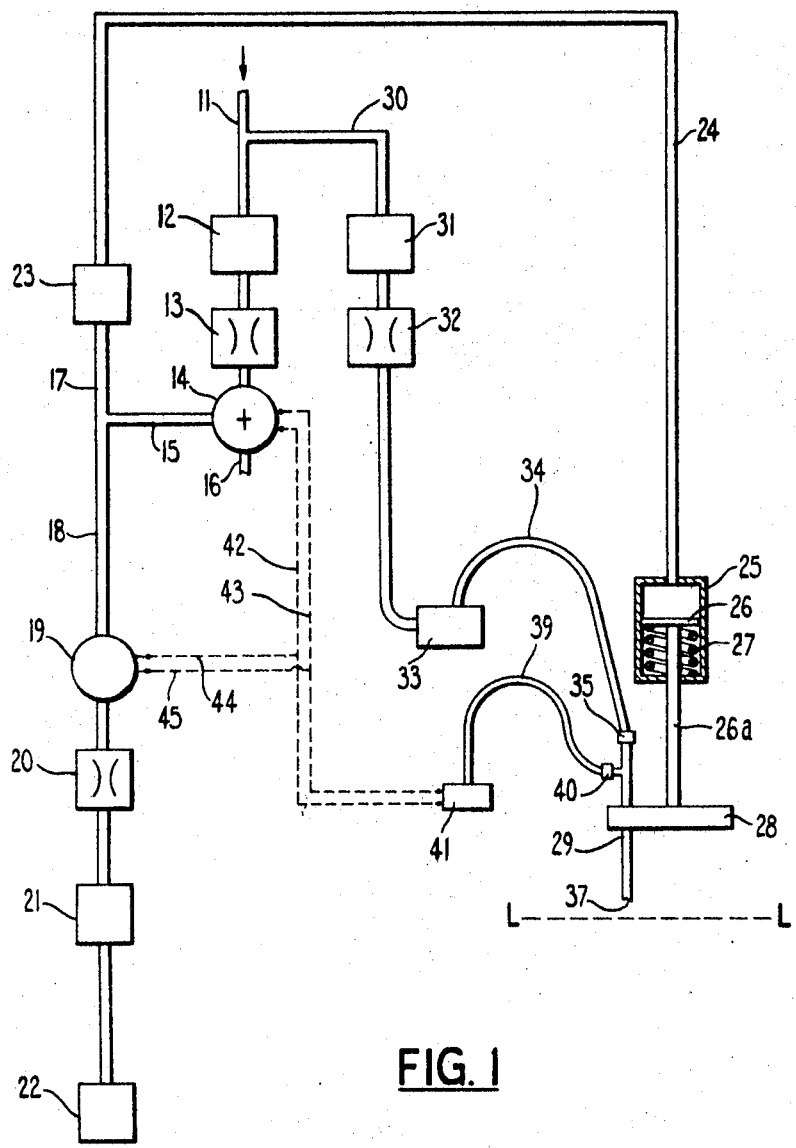
FIG. 1 shows, diagrammatically, a pneumatic device for measuring the height of the surface of liquid glass.

Referring to the drawings, a hollow probe 29 mounted above a surface LL of molten glass has a gas outlet in the form of an open lower end which directs gas issuing therefrom onto the surface LL of the liquid. A flexible tube 34 supplies gas to the probe 29, and a device 41, for example a pressure switch, is responsive to gas pressure at the probe outlet in excess of a predetermined maximum value occurring when the outlet is at least partially closed by the molten glass. The probe outlet is of such dimensions and shape as to be progressively closed on entry thereof into the liquid and so that, when it is above the liquid surface, restriction of the outlet by the liquid to cause the gas pressure therein to be at said predetermined maximum value will not be sustained solely by the surface tension of the liquid.

In FIG. 1, air at 40 p.s.i. is supplied to a tube 11 and the air passes through a regulator 12 and a restrictor 13 which reduce the air pressure to 16 p.s.i. The air at 16 p.s.i. passes to a solenoid valve 14 which, when de-energized, allows the air to flow from restrictor 13 through valve 14 to a tube 15 and, when energized, terminates the air supply to tube 15 and connects tube 15 to an exhaust tube 16.

Tube 15 terminates at a T junction with tubes 17 and 18. Tube 18 connects the air supply through a solenoid valve 19, which is open when de-energized, and through a restrictor 20 and a capacity vessel 21, to an indicator device shown as a pressure recorder 22. Tube 17 connects the air supply through a capacity vessel 23 and a tube 24 to the interior of the upper end of a cylinder 25. The recorder system, comprising restrictor 20, capacity vessel 21 and recorder 22 is sealed off from tube 18 when valve 19 is energized and thus the sealed system is maintained at constant pressure and allows recorder 22 to maintain a constant reading whilst valve 19 is energized.

A piston 26 is slidably arranged in cylinder 25 and a coil compression spring 27 urges piston 26 upwardly within cylinder 25 against the force developed by the air pressure in the upper portion of cylinder 25. A piston rod 26a attached to piston 26 carries a beam 28 which supports the probe 29 within a furnace enclosure, on an outer wall, not shown, of which the cylinder 25 is mounted. Probe 29 is supplied with low pressure air by way of the flexible tube 34 connected by a coupling 35 to the upper end of probe 29 and connected to tube 11 via a capacity vessel 33, a restrictor 32, a regulator 31, and tube 30.

Figure 2:
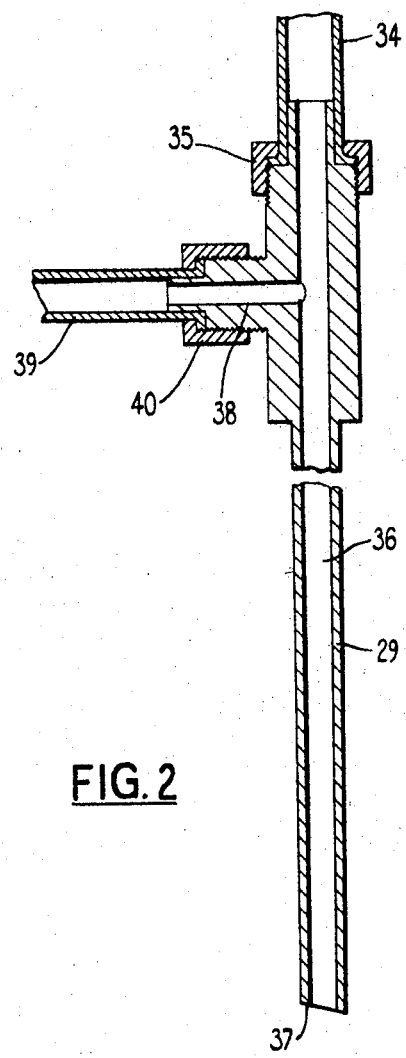
FIG. 2 shows a vertical section through a probe embodied in the device illustrated in FIG. 1.

Referring now to FIG. 2, the probe 29 has an axial passageway 36 communicating with the bore of the flexible tube 34, which passageway 36 terminates in a gas outlet 37 at the lower end of probe 29 which is inclined to the surface LL of the liquid glass. A transverse passage 38 communicates with the passageway 36 and with the bore of a flexible tube 39 connected to probe 29 by a coupling 40. As shown in FIG. 1, the flexible tube 39 communicates with the pressure sensitive switch 41.

The pressure switch 41 is operated when the pressure in passageway 36, transmitted to switch 41 by way of passageway 38 and tube 39, exceeds a predetermined maximum value of 0.075" water gauge and operation of switch 41 is signalled by way of electrical conductors 42 and 43 to energise valve 14, and by way of electrical conductors 44 and 45 to energize valve 19.

The arrangement operates as follows:

In a rest position with the 40 p.s.i. air supply to tube 11 cut off, no air flows through the system, the piston 26 remains in its uppermost position in cylinder 25 so that probe 29 is in its uppermost position, and as the air pressure in passageway 36 of probe 29 and in tube 39 is less than 0.075" water gauge switch 41 is inoperative and valves 14 and 19 are de-energized.

Air at 40 p.s.i. is now supplied to tube 11 and air at 16 p.s.i. is released through valve 14 into tube 15 to cause a rise in pressure in the recorder system and also in the cylinder system, the increase in pressure being slow due to the capacity of vessels 20 and 23. Because the recorder system and the cylinder system are both supplied with air by the common tube 15, the pressure in both systems is substantially uniform.

At the same time that air at 16 p.s.i. is supplied to tube 15, air at low pressure is also released into passageway 36 of probe 29 by way of regulator 31, restrictor 32 and vessel 33, but as the outlet at the lower end 37 of probe 29 is unrestricted, the air in passageway 36 flows freely to atmosphere so that the air pressure in passageway 36 is below 0.075" water gauge and switch 41 remains inoperative at this stage.

As the air pressure in the cylinder 25 slowly increases, the piston 26 is forced downwards against the action of spring 27 so that probe 29 is lowered towards the surface LL of the molten glass, but switch 41 remains inoperative until probe 29 has been lowered to such an extent that the inclined gas outlet 37 is partially immersed in the molten glass and the free flow of air from passageway 36 becomes restricted and causes the pressure in passageway 36 to rise. The capacity vessel 33 and tubes 34 and 39 have a small volume so that restriction of passageway 36 causes a rapid increase of pressure within passageway 36 and tubes 34 and 39.

When the pressure in passageway 36 increases above 0.075" water gauge the increased pressure in tube 39 causes switch 41 to energize the valves 14 and 19.

Valve 14, when energised, terminates the supply of air through valve 14 to tube 15 and connects tube 15 to exhaust pipe 16 so that the cylinder system begins to exhaust and piston 26 is raised by coil spring 27 to elevate probe 29. As probe 29 is elevated the probe gas outlet is raised from the liquid surface and allows the free escape of air from passageway 36 to atmosphere so that the pressure in passageway 36 and thus in tube 39, tube 34 and vessel 33 falls until, at a predetermined minimum pressure a little below 0.075" water gauge, switch 41 de-energises the valves 14 and 19.

Valve 19, when energised, seals off the recorder system from the tube 18 so that whilst the cylinder system is exhausting to exhaust tube 16 the pressure in the recorder system is maintained constant and a constant recorder reading is obtained. When switch 41 against de-energises the valves 14 and 19, due to the elevation of probe 29, the valve 14 again connects the air supply from restrictor 13 to tube 15 to instigate the next sensing cycle, and valve 19 opens to allow the recorder system to again be in communication with the cylinder system and to adopt a unified pressure therewith.

With the arrangement described above, the probe stroke is dependent on the resistance of spring 27 and the volume of the low pressure system between restrictor 32 and the outlet 37 from passageway 36. As both these factors can be readily varied the stroke of probe 29 can be varied. The reciprocating speed of piston 26 is dependent upon the volume of the cylinder system and the recorder system and as these volumes can be readily varied, i.e. by changing the volumes of the capacity vessels 23 and/or 21, the number of reciprocations per minute can be varied. Conveniently, in practice, a probe stroke of 1" with 15 reciprocations/minute has been found to be advantageous.

FIG. 2 of the drawings shows the probe 29 in greater detail and it should be observed that the lower regions of the probe 29 are formed by a plain-bore tube and the outlet 37 from the lower end of the tube is, as shown in the drawings, inclined to the glass level LL. Consequently during downward displacement of probe 29, the lowermost region of outlet 37 first contacts the molten glass and further downward displacement thereof causes the outlet 37 to be progressively immersed in the molten glass to gradually seal off the passage 36 from atmosphere. It has been found, in practice, that this action, together with a large diameter passageway 36, i.e. a passageway in the region of ¼" in diameter, and a low gas release pressure from passageway 36 prevents disruption of the glass level surface as the probe enters thereinto.

Further, the inclined underface of the tube allows glass condensates on the inside or outside of the probe and glass picked-up by the probe to collect on the lowermost side of the tube around the outlet 37 and this feature, in combination with the large diameter of passageway 36, ensures that the passageway 36 is always clear and never restricted by foreign matter.

Conveniently, the angle of inclination of the outlet 37 is 5° to 10° to the horizontal and with such a form apparatus operating at 1″ stroke with 15 strokes/minute can be arranged to operate switch 41 when the inclined outlet 37 is partially but not wholly immersed in molten glass. In one embodiment of the invention the gas outlet 37 is so shaped and dimensioned as to cause the pressure sensitive switch 41 to operate when approximately one half of the outlet is immersed in the liquid.

Because the probe is brought into contact with the molten glass, it must be made from a material which can withstand the constant immersion in the glass without adversely affecting the glass. In one example, the probe is manufactured of platinum.

Further, to avoid the flow of electrical energy from the glass through the probe, the probe is insulated from earth and conveniently the beam 28 is constructed from a rigid electrically insulating material such as Sindanyo board.

Although in the preferred embodiment described, the outlet 37 of the probe tube is inclined to the horizontal, it will be understood that a variety of other configurations may be used in which the underface of the gas outlet or a portion thereof is at an angle to the horizontal whereby downward displacement of the tube causes the gas outlet to be progressively closed by the liquid. Thus the tube may have a number of notches, or may have a vertical slit extending upwards from its lower end.

Whilst it is envisaged that the probe will normally be movably mounted to measure varying height of the liquid surface, a fixed probe may be used where it is required merely to obtain an indication that a liquid has reached a predetermined level.

I claim:
1. A device for indicating the height of the surface of a liquid comprising a hollow probe mountable above the liquid surface and having a gas outlet disposed in its lower end portion to direct gas issuing therefrom towards the surface of the liquid, means for supplying gas to the hollow probe, a device responsive to gas pressure at the probe outlet in excess of a predetermined maximum value occurring when the outlet is at least partially closed by the liquid, the probe outlet being of such dimensions and shape as to be progressively closed on entry thereof into the liquid and so that, when it is above the liquid surface, restriction of the outlet by the liquid to cause the gas pressure to be at the said predetermined maximum value will not be sustained solely by the surface tension of the liquid, and an indicator device operatively connected with said device responsive to gas pressure at the probe outlet and arranged to record the height of the liquid as determined by the immersion or partial immersion of the probe outlet in the liquid.

2. A device according to claim 1, wherein the gas outlet opens downwardly at the lower end of the probe and at least a portion of the underface of the gas outlet is inclined at an angle to the horizontal so that entry of the probe into the liquid causes the gas outlet to be progressively closed by the liquid.

3. A device according to claim 2, wherein the gas outlet is defined by the lower rim of a plain bore tube.

4. A device according to claim 2, wherein the inclined portion of the outlet is at an angle of 5° to 10° to the horizontal.

5. A device according to claim 2, including means for raising and lowering the probe.

6. A device according to claim 5, wherein the means for raising and lowering the probe is actuated in response to a control device operable by said device responsive to the pressure at the probe outlet to cause the probe to move downwardly when the gas pressure at the probe outlet is below the said predetermined maximum value and to move upwardly when the gas pressure at the probe outlet is above a predetermined minimum value, whereby the probe is caused to reciprocate through a range of vertical distance and the probe outlet is intermittently immersed or partially immersed in and withdrawn from the liquid.

7. A device according to claim 6, wherein the means for raising and lowering the probe are pneumatically operated, and wherein the control device comprises a valve or valves for regulating the operation of the pneumatically operated means.

8. A device according to claim 7, wherein the device responsive to pressure in the probe outlet is a pressure switch arranged to control operation of said valve or valves.

9. A device according to claim 7, wherein the means for raising and lowering the probe comprises a pneumatic cylinder having a piston therein connected with the probe and urged to move by pneumatic pressure in one direction and by a resilient element such as a spring in the other direction, whereby the position of the probe is dependent on the relative values of said pressure and the force exerted by the resilient element, and in which the pressure in the cylinder is communicated to the said indicator device.

10. A device according to claim 8, wherein the means for raising and lowering the probe comprises a pneumatic cylinder having a piston therein connected with the probe and urged to move by pneumatic pressure in one direction and by a resilient element such as a spring in the other direction, whereby the position of the probe is dependent on the relative values of said pressure and the force exerted by the resilient element, and in which the pressure in the cylinder is communicated to the said indicator device.

11. A device according to claim 2, wherein the gas outlet is so dimensioned and shaped as to cause the device sensitive to pressure in the probe outlet to operate when approximately one half of the outlet is immersed in the liquid.

References Cited

UNITED STATES PATENTS 2,737,807 3/1956 Brichard _____ 73—290
3,213,670 10/1965 Macgeorge _____ 73—290 X S. CLEMENT SWISHER, *Primary Examiner.*